United States Patent [19]

Kambayashi

[11] Patent Number: 4,562,574
[45] Date of Patent: Dec. 31, 1985

[54] FRAME SYNCHRONIZING SIGNAL INSERTION SYSTEM

[75] Inventor: Yuusaku Kambayashi, Tokyo, Japan

[73] Assignee: NEC Corporation, Tokyo, Japan

[21] Appl. No.: 484,685

[22] Filed: Apr. 13, 1983

[30] Foreign Application Priority Data

Apr. 22, 1982 [JP] Japan .................................. 57-67794

[51] Int. Cl.³ .............................................. H04J 3/06
[52] U.S. Cl. ...................................... 370/100; 370/13
[58] Field of Search .................. 370/100, 102, 13, 105

[56] References Cited

U.S. PATENT DOCUMENTS

| | | | |
|---|---|---|---|
| 3,995,120 | 10/1976 | Pachynski, Jr. | 370/100 |
| 4,004,100 | 1/1977 | Takimoto | 370/106 |
| 4,025,720 | 5/1977 | Pachynski, Jr. | 370/102 |
| 4,266,292 | 5/1981 | Regan et al. | 370/13 |
| 4,316,284 | 2/1982 | Howson | 370/105 |
| 4,316,285 | 2/1982 | Bobilin et al. | 370/105 |
| 4,393,492 | 7/1983 | Bishop | 370/15 |
| 4,397,020 | 3/1983 | Howson | 370/105 |

Primary Examiner—Douglas W. Olms
Assistant Examiner—Kenneth I. Rokoff
Attorney, Agent, or Firm—Charles E. Pfund

[57] ABSTRACT

A frame synchronizing signal insertion system at a transmitting end has a plurality of multiplexers. Frequency-divided frame synchronizing signals are produced by frame pattern generators of the plurality of multiplexers, respectively. These frequency-divided frame synchronizing signals which have different patterns are logic-ORed by a multiplex gate so as to obtain a composite frame pattern. When a composite multiplex signal having the composite frame pattern is transmitted to a receiving end and the composite frame pattern does not match a predetermined pattern, the receiving end can detect a malfunction of any one of the multiplexers at the transmitting end, and transmits an alarm signal or the like to indicate malfunctioning of the corresponding multiplexer.

3 Claims, 5 Drawing Figures

FRAME SYNCHRONIZING SIGNAL INSERTION SYSTEM

BACKGROUND OF THE INVENTION

1. Field of the Invention

The present invention relates to a frame synchronizing signal insertion system.

2. Description of the Prior Art

In a transmission system for time-division multiplexed digital signals, frame synchronizing signals are added, at a transmitting end, to a plurality of digital pulses for conversion into a multiplex signal with a predetermined frame pattern so as to achieve frame synchronization between multiplex conversion sections at the transmitting and receiving ends. In practice, the multiplex conversion section at the transmitting end comprises a plurality of multiplexers which are separately arranged in casings or cabinets. Pulses from these multiplexers are time-division multiplexed to obtain a single multiplex signal which is then transmitted to the receiving end through a channel.

Conventionally, a frame synchronizing signal is added to the pulses in one of the plurality of multiplexers at the transmitting end. For this reason, when any multiplexer other than the multiplexer which is subject to frame synchronizing signal insertion operates erroneously or stops operating accidentally, such a defective operation cannot be detected by a frame sync detector at the receiving end. As a result, the receiving end cannot transmit an alarm signal or the like to indicate malfunctioning of the multiplexer at the transmitting end.

SUMMARY OF THE INVENTION

The present invention has been made to eliminate the conventional drawbacks, and has for its object to provide a frame synchronizing signal insertion system wherein a receiving end can detect malfunctioning of any one of a plurality of multiplexers at a transmitting end.

In order to achieve the above object of the present invention, there is provided a frame synchronizing signal insertion system comprising a plurality of transmission-side multiplex converting means. Each of the plurality of transmission-side multiplex converting means has a time division means and a multiplex gate means. The time division means comprises a timing pulse generating means, at least one sampling means, and a frame pattern generating means. The timing pulse generating means generates a first timing pulse signal which indicates times at which a frame synchronizing signal is inserted, and a second timing pulse signal which indicates times at which time division is performed. The first timing pulse signal is supplied to the frame pattern generating means which produces a frequency-divided frame synchronizing signal having a predetermined pattern. The second timing pulse signal is supplied to at least one sampling means which then produces a time division signal. The multiplex gate means receives at least the frequency-divided frame synchronizing signal and the time division signal so as to produce a single multiplex signal in accordance with a given frame pattern.

DETAILED DESCRIPTION OF THE PREFERRED EMBODIMENT

Figure 1:
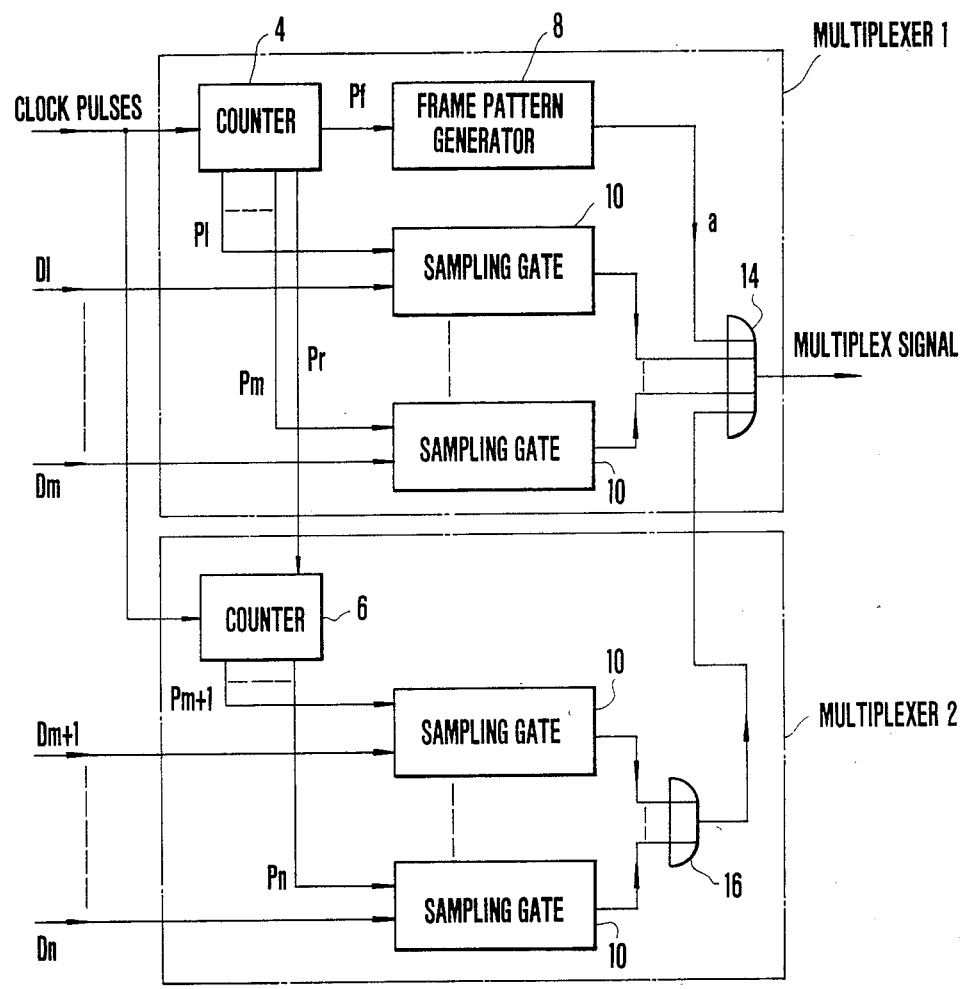
Fig. 1 is a block diagram of a conventional frame synchronizing signal insertion system.

In order to best understand the present invention, a conventional frame synchronizing signal insertion system will first be described with reference to FIG. 1.

A transmission-side multiplex conversion section comprises a first multiplexer 1 and a second multiplexer 2. This section time-division multiplexes digital signals $D_l$ to $D_n$ (where n is a predetermined positive integer) and inserts a frame synchronizing signal having a predetermined pattern into a digital (sample) pulse train so as to produce a single multiplex signal to be transmitted to a receiving end. In this conventional system, the frame synchronizing signal is inserted into a digital pulse train only in the first multiplexer 1. In the first multiplexer 1, digital signals $D_l$ to $D_m$ (where m is a positive integer smaller than n) are supplied to corresponding sampling gates 10, respectively. A counter 4 receives clock pulses and supplies pulse signals $P_l$ to $P_m$ to the corresponding sampling gates 10, respectively. The pulse signals $P_l$ to $P_m$ respectively indicate the transmission timings of the digital signals $D_l$ to $D_m$ for every frame. The counter 4 also supplies a timing pulse signal Pf to a frame pattern generator 8. The timing pulse signal Pf is said to indicate the transmission timing of the frame synchronizing signal for each frame though the frame synchronizing signal is usually derived out of the timing pulse signal at an interval of at least two frame periods. The counter 4 further supplies a timing pulse signal Pr to a counter 6. The timing pulse signal Pr indicates the operating timing of the second multiplexer 2. Each sampling gate 10 of the first multiplexer 1 receives one of the digital signals $D_l$ to $D_m$ together with corresponding one of the pulse signals $P_l$ to $P_m$. The sampling gate 10 then passes the corresponding digital signal when the pulse signal is kept high. This digital signal is supplied to a multiplex gate 14. The frame pattern generator 8 produces a frame synchronizing signal a in synchronism with the timing pulse signal Pf. The frame synchronizing signal a is then supplied to the multiplex gate 14. In the second multiplexer 2, digital signals $D_{m+1}$ to $D_n$ are supplied to corresponding sampling gates 10, respectively, in the same manner as in the first multiplexer 1. The counter 6 receives the clock pulses and the timing pulse signal Pr, and generates signals $P_{m+1}$ to $P_n$ which respectively indicate the transmission timings of the digital signals $D_{m+1}$ to $D_n$. These signals $P_{m+1}$ to $P_n$ are supplied to the corresponding sampling gates 10, respectively. The digital signal passed by each sampling gate 10 is time-division multiplexed by a multiplex gate 16, and a resultant multiplexed digital signal is supplied to the multiplex gate 14. The multiplex gate 14 multiplexes the digital signals passed by the corresponding sampling gates 10, the multiplexed digital signal from the multiplex gate 16, and the frame synchronizing signal a from the frame pattern generator 8. A resultant single multiplex signal having a predetermined frame pattern is then transmitted by the multiplex gate 14 to a receiving end through a corresponding channel.

Figure 3A:
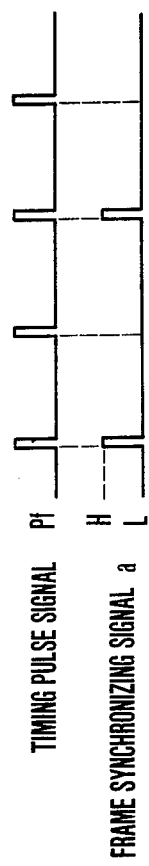
FIGS. 3a and 3b are timing charts for explaining frame synchronization in the systems shown in FIGS. 1 and 2, respectively.

FIG. 3a is a timing chart showing a frame synchronizig signal a in the system shown in FIG. 1. The frame synchronizing signal a having a predetermined frame pattern is produced by deriving out the timing pulse signal Pf by means of the frame pattern generator 8 at an interval, in this example, of two frame periods. Thus, the frame pattern generator 8 may be a frequency divider. The synchronizing signal a has then a predetermined logic level pattern, a pattern "H, L, H, L" in this example. In the system shown in FIG. 1, the frame pattern generator 8 produces the frame synchronizing signal a having the above-mentioned pattern in response to the pulse train of the timing pulse signal Pf.

Figure 2:
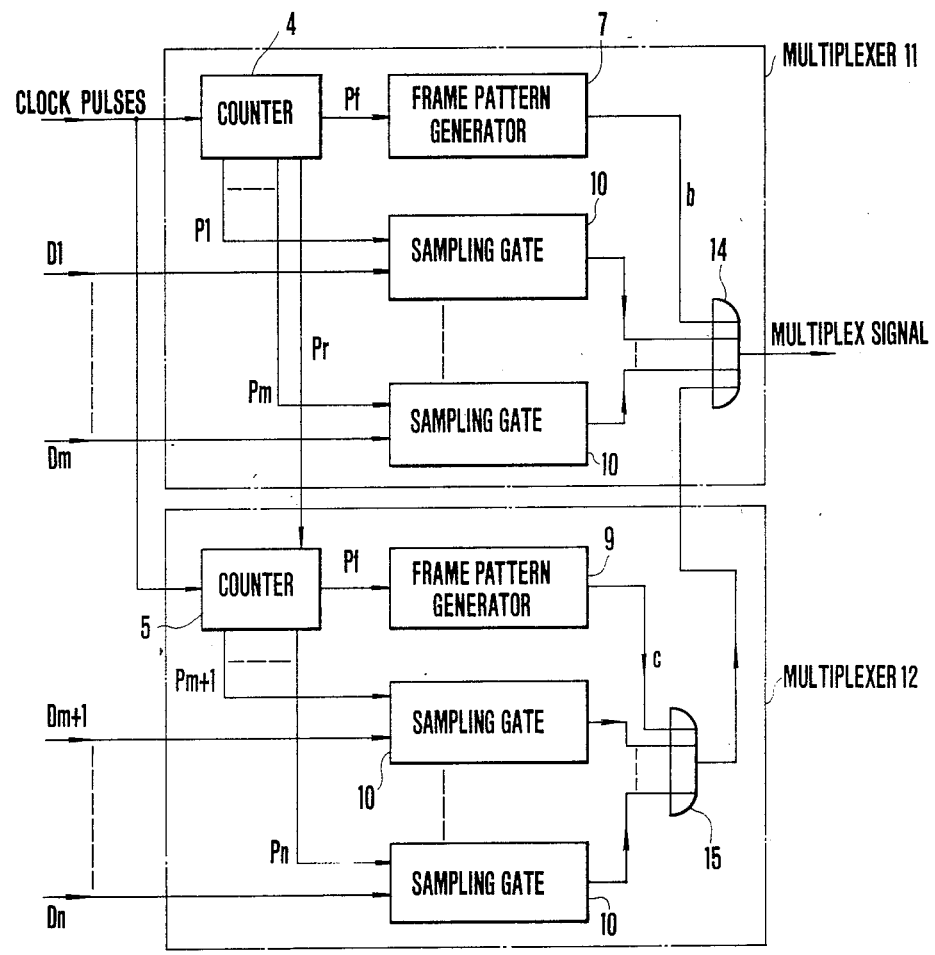
FIG. 2 is a block diagram of a frame synchronizing signal insertion system according to an embodiment of the present invention.

Turning now to FIG. 2, a frame synchronizing signal insertion system according to an embodiment of the present invention will now be described. Frequency-divided frame synchronizing signals are inserted into digital (sample) pulse trains in the first and second multiplexers 11 and 12, respectively. Any other operation is the same as the corresponding operation of the system shown in FIG. 1, and a detailed description thereof will be omitted. In FIGS. 1 and 2, like elements are designated by like reference numerals.

As shown in FIG. 2, frame pattern generators 7 and 9 are arranged in the first and second multiplexers 11 and 12, respectively. The frame pattern generators 7 and 9 receive timing pulse signals Pf from counters 4 and 5, respectively. The timing pulse signal Pf involves the transmission timing of a frequency-divided frame synchronizing signal b or c in the same manner as described with reference to FIG. 1. The frame pattern generators 7 and 9 both generate frequency-divided frame synchronizing signals at a low level when a low level of a combined frame pattern signal is to be produced. Conversely, either frame pattern generator 7 or 9 generates a high level of frequency-divided frame synchronizing signal b or c when a high level of the combined frame pattern signal is to be produced. The two frequency-divided frame synchronizing signals are set such that each has at least one high level and they correspond to a desired ultimate frame pattern when logic-ORed. One of the frequency-divided frame synchronizing signals is generated by the frame pattern generator 7, and the other is generated by the frame pattern generator 9.

Figure 3B:
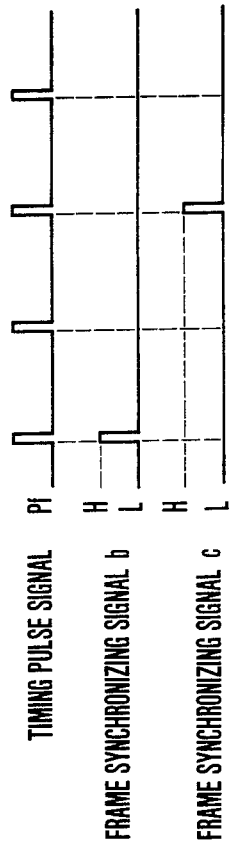

FIG. 3b is a timing chart for explaining frame synchronization using the frequency-divided frame synchronizing signals in the system shown in FIG. 2. A frequency-divided frame synchronizing signal is produced in synchronism with the timing pulse signal Pf by either the frame pattern generator 7 or 9. In this example, the frequency-divided frame synchronizing signals b and c have frame patterns "H, L, L, L" and "L, L, H, L", respectively. Each frequency-divided frame synchronizing signal includes one high level. When the two frequency-divided frame synchronizing signals b and c are logic-ORed, a resultant composite frame synchronizing signal has the same pattern (i.e., "H, L, H, L") as the frame synchronizing signal a. In the system shown in Fig. 2, when the frame pattern generators 7 and 9 receive the timing pulse signal Pf, they produce the frequency-divided frame synchronizing signals b and c, respectively, in accordance with predetermined frame patterns. Thus, the frame pattern generators 7 and 9 may for example be frequency dividers.

In the system shown in FIG. 2, a multiplex gate 15 of the multiplexer 12 time-division multiplexes the digital signals $D_{m+1}$ to $D_n$ and the frequency-divided frame synchronizing signal c to produce a composite multiplexed signal. The composite multiplexed signal is then supplied to the multiplex gate 14. The multiplex gate 14 time-division multiplexes the digital signals $D_l$ to $D_n$, and the division frame synchronizing signals b and c so as to produce a resultant single multiplex signal having a predetermined frame pattern.

The multiplexed signal from the first multiplexer 11 thus contains a predetermined frame pattern which is obtained by logic-ORing the predetermined patterns of the frequency-divided frame synchronizing signals respectively produced in the first and second multiplexers 11 and 12. Furthermore, the frequency-divided frame synchronizing signals produced in the first and second multiplexers 11 and 12 respectively have at least one high level but do not have each a high level simultaneously. When one of the first and second multiplexers 11 and 12 is in trouble and one of the frequency-divided frame synchronizing signals b and c is not transmitted, a resultant composite multiplexed signal may not have the predetermined frame pattern. As a result, the receiving end is able to transmit an alarm signal or the like to the transmitting end.

Figure 4:
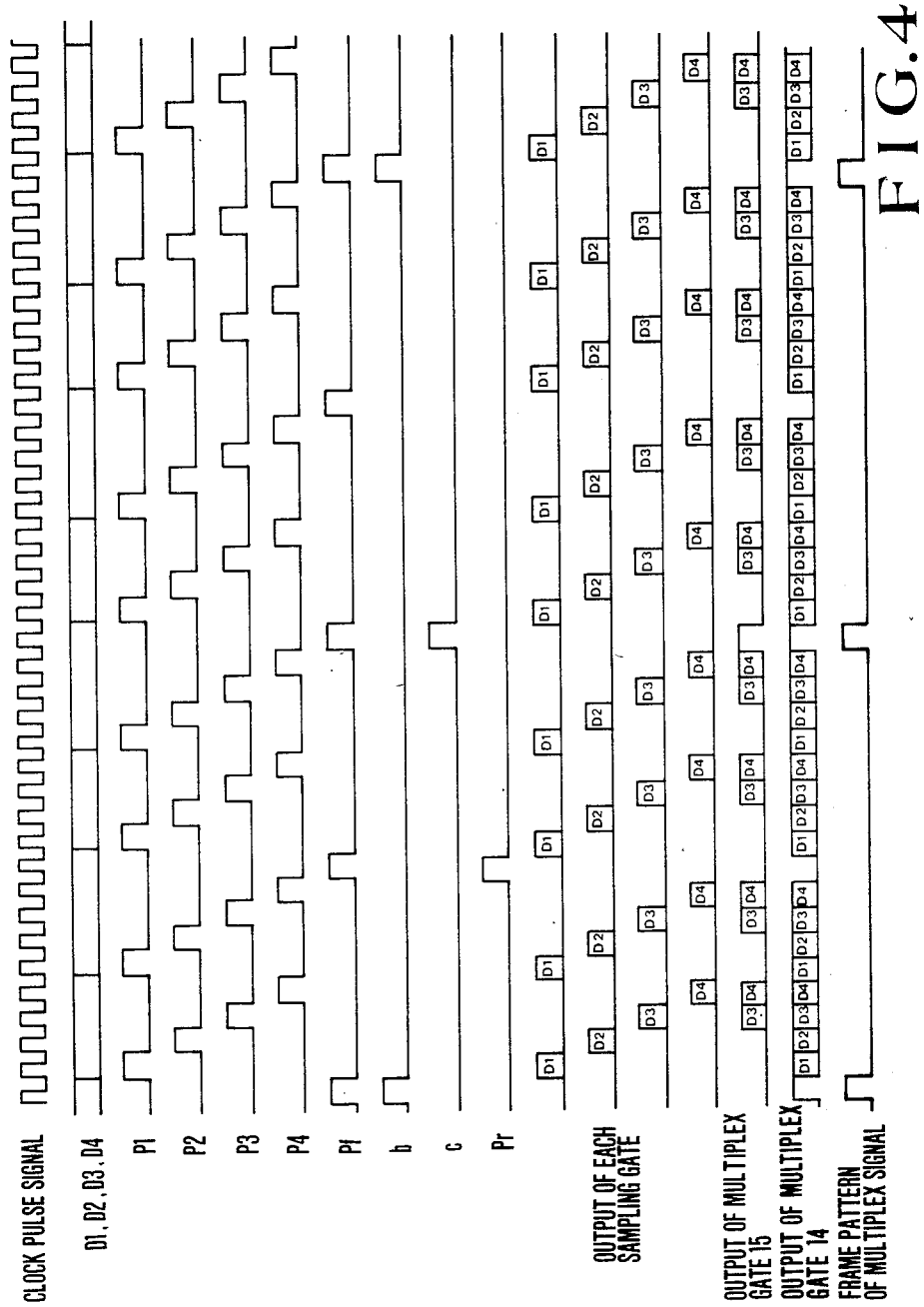
FIG. 4 is a timing chart for explaining the operation of the system shown in FIG. 2 when 4-channel multiplexers are used.

Reference is now made to FIG. 4 and it is assumed that suffix n of the digital signals $D_l$ to $D_n$ used for the description of the embodiment with reference to FIG. 2 is given 4 (i.e., 4-channel time-division multiplexing), and that channel numbers m and m+1 are given 2 and 3, respectively. The same reference numerals as used in Fig. 2 denote the same parts in FIG. 4, and a detailed description thereof will be omitted.

Referring to FIG. 4, digital signals to be multiplexed $D_1$ to $D_4$ which are frequency- and phase-synchronized with each other are supplied to the corresponding sampling gates 10 of the first and second multiplexers 11 and 12. On the other hand, timing signals $P_1$ to $P_4$ which are obtained by frequency-dividing the clock pulses synchronized with the digital signals $D_1$ to $D_4$ are also supplied to the corresponding sampling gates 10, respectively. As a result, the digital signals $D_1$ to $D_4$ pass through the sampling gates 10 at the sampling timing of the signals $P_1$ to $P_4$, respectively.

On the other hand, the timing pulse signal Pf having a period of one frame is supplied from the counter 4 to the frame pattern generator 7. The frame pattern generator 7 counts down the timing pulse signal Pf by ¼ to produce the signal b. Thus, the frame pattern generator 7 may be a ¼ frequency divider. Similarly, the timing pulse signal Pf from the counter 5 is supplied to the frame pattern generator 9. The frame pattern generator 9 also generates a signal c which has a frequency corresponding to one-fourth of that of the timing pulse signal Pf. It should be noted that the signals b and c may not be simultaneously generated. The frame pattern generator 9 may also be a ¼ frequency divider, and asynchronism of the two generators 7 and 9 may be accomplished in a manner well known in the art. Meanwhile, a pulse signal Pr is supplied from the counter 4 to the counter 5 so as to constantly synchronize the counter 5 of the second multiplexer 12 with the counter 4 of the first multiplexer 11.

The multiplex gate 15 time-division multiplexes the respective output signals (time division signals) of the corresponding sampling gates 10 and the signal c from the frame pattern generator 9, and produces a composite multiplexed signal which comprises digital signals of the 3rd and 4th channels and the frequency-divided frame synchronizing signal c.

The multiplex gate 14 time-division multiplexes the output signals (time division signals) of the 1st and 2nd channels, the frequency-divided frame synchronizing signal b from the frame pattern generator 7, and the composite multiplexed signal from the multiplex gate 15, and produces a composite multiplexed signal output of multiplex gate 14 shown in FIG. 4 which comprises the digital signals of the 1st to 4th channels and a composite frame synchronizing signal (the signal obtained by adding the frequency-divided frame synchronizing signals b and c and shown in FIG. 4 as frame pattern of multiplex signal) so as to have a composite frame pattern indicating the predetermined patterns of the signals b and c. Therefore, when one of the first and second multiplexers 11 and 12 is in trouble, the composite multiplexed signal from the first multiplexer does not have the composite frame pattern, thereby allowing detection of malfunctioning at the receiving end.

FIGS. 2 and 3b illustrate only one preferred embodiment. The pattern of the frame synchronizing signal and the number of multiplexers are not limited to those in the above embodiment. For example, in the case of transmitting signals from three or more multiplexers, respectively, so as to perform multiplexing, the same effect as obtained in the above embodiment can be obtained by arranging a frame pattern generator in each multiplexer. Furthermore, it is obvious that the present invention can be applied to a frame synchronizing signal having any pattern.

In addition to the above modifications, frequency-divided frame synchronizing signals of the same pattern may be produced by the respective multiplexers and may be logic-ANDed to produce a composite frame synchronizing signal, thereby obtaining the same effect as in the above embodiment.

In summary, according to the frame synchronizing signal insertion system of the present invention, when signals transmitted from respective multiplexers are to be multiplexed at the transmitting end, the reception end can detect a malfunction of any multiplexer at the transmiting end.

What is claimed is:

1. A frame synchronizing signal insertion system at a transmitting end comprising a plurality of multiplex converting means each of which has time division means and multiplex gate means, said time division means comprising:

timing clock generating means for receiving a frequency-dividing clock signal and for generating a first timing pulse signal which indicates a time at which a frequency-divided frame synchronizing signal is inserted and at least one second timing pulse signal which indicates a time at which an input digital signal is subject to time division;

at least one samplng means for sampling the input digital signal in response to said at least one second timing pulse signal and for producing a time division signal; and frame pattern generating means for generating the frequency-divided frame synchronizing signal which has a predetermined pattern at the time indicated by the first timing pulse signal, said pattern including at least one pulse, said multiplex gate means receiving at least the frequency-divided frame synchronziing signal and the time division signal so as to produce a single multiplex signal in accordance with a given frame pattern wherein said multiplex gate means of said plurality of multiplex converting means include:

a first multiplex gate which receives at least one corresponding time division signal and a corresponding frequency-divided frame synchronizing signal having a first frame pattern so as to produce a first composite multiplex signal which has the first frame pattern; and at least one second multiplex gate which receives at least one other corresponding time division signal, another corresponding frequency-divided frame synchronizing signal having a second frame pattern, and the first composite multiplex signal so as to produce a second composite multiplex signal having a composite frame pattern which is obtained by logic-ORing the frequency-divided frame synchronizing signals having the first and second frame patterns which differ from each other, said at least one second multiplex gate transmitting the second composite multiplex signal to the receiving end.

2. A system according to claim 1, wherein each of said frame pattern generating means comprises a frequency divider for frequency-dividing a corresponding first timing pulse signal in accordance with the number of said sampling means of each of said plurality of multiplex converting means.

3. A system according to claim 1, wherein the second frame pattern is obtained by logic-ANDing the frequency-divided frame synchronizing signals having the first and second frame patterns which are the same.

* * * * *